United States Patent [19]

Perry et al.

[11] 3,859,136

[45] Jan. 7, 1975

[54] SEAWATER BATTERY WITH VALVE

[75] Inventors: Philip George Perry; Thomas Hector Purcell, both of Raleigh, N.C.

[73] Assignee: ESB Incorporated, Philadelphia, Pa.

[22] Filed: May 18, 1973

[21] Appl. No.: 361,566

[52] U.S. Cl. ............... 136/100 M, 136/90, 136/91, 136/112, 136/113
[51] Int. Cl. ......................................... H01m 23/02
[58] Field of Search ......... 136/90, 91, 92, 112, 113, 136/114, 162, 100 M

[56] References Cited
UNITED STATES PATENTS

| 1,310,586 | 7/1919 | Straub et al. | 136/90 |
| 3,005,863 | 10/1961 | Floyd et al. | 136/90 |
| 3,046,325 | 7/1962 | Peffer | 136/90 |

*Primary Examiner*—Winston A. Douglas
*Assistant Examiner*—John F. Niebling

[57] ABSTRACT

An immersion type battery using seawater as electrolyte and having metallic anodes and metal halide cathodes is enclosed in a container. The container is supplied with a valve which in above-surface conditions closes and seals the battery against entry of fluids to the battery compartment. However, when the battery is allowed to fall into water of unrestricted depth, the valve, at a predetermined pressure, will open, allowing water to infiltrate the battery and thus activate it. The opening of the valve is controlled by a valve retaining means, calibrated to permit the opening of the valve at the required pressure. The valve retaining means also prevents the valve from subsequent reclosure regardless of shock or changes in ambient pressures.

7 Claims, 4 Drawing Figures

PATENTED JAN 7 1975  3,859,136

SEAWATER BATTERY WITH VALVE

BACKGROUND OF THE INVENTION

1. Field of the Invention

This invention relates to seawater batteries of the type that can be dropped from the air into water. In particular, it relates to a means for sealing such batteries during storage yet permitting activation when battery is immersed to a predetermined depth in water.

2. Description of the Prior Art

For certain classes of service, batteries using seawater as electrolyte have been found to have considerable use. Such batteries may have anodes made from metals such as zinc, cadmium, aluminum and magnesium, etc. Cathodes of silver chloride, cuprous chloride, lead chloride and other similar materials have been used. Such batteries in the past have been constructed to have openings in the container walls to allow an inflow of water when the batteries are immersed. It has been found that atmospheric moisture can enter such batteries during prolonged storage periods and damage the internal parts of the battery. Other batteries have been built in which the battery openings are sealed with protective tapes, etc. With such batteries it is necessary to remove the seals prior to use. However, the operation of removing the seals often can be burdensome.

SUMMARY OF THE INVENTION

An immersion activated battery comprising battery elements located in a container includes a valve in the container wall. The valve has a face external to the battery. A valve retaining means comprising a ductile bar keeps the valve closed during storage conditions but permits the valve to open upon exposure to a predetermined pressure. Opening the valve by the exposure to pressure such as immersion in seawater allows the water to flow into the battery and activate it. The valve retainer prevents reclosing of the valve once it has been opened regardless of pressure changes, shock, etc.

DESCRIPTION OF THE PREFERRED EMBODIMENT

Figure 1:
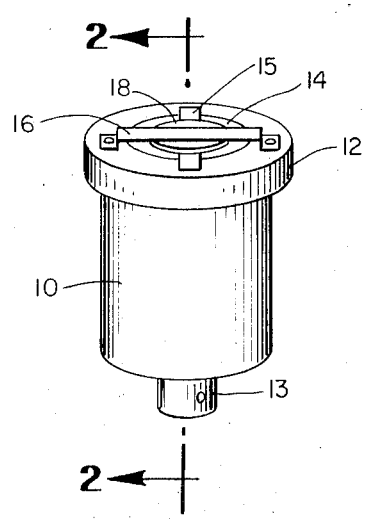
FIG. 1 is an isometric view of a battery with the valve of the invention.

A battery container 10 FIG. 1 has a cover 12 fastened thereto. The cover defines an opening 42 (FIG. 4), the opening providing access between the interior of the container and the space exterior to the container. A circular valve member 20 (FIG. 2) is located in the valve opening 42. A face 14 of a valve mounted in the battery cover is external to the battery. The valve is prevented from being forced into the battery by a valve retaining means 15, in this case, a flat bar of ductile material greater in length than the opening 42 and spanning the opening.

The valve retaining means 15 is held to the valve by a backing piece 17. Retaining means 15 with backing piece 17 are held to the face 14 of valve 20 by a screw or other form of fastener 18 (see FIG. 2).

A valve stop 16 spans the valve opening and prevents the valve from the coming out of the battery cover as might be caused by reduced external pressure, vibration, shock, etc.

Figure 2:
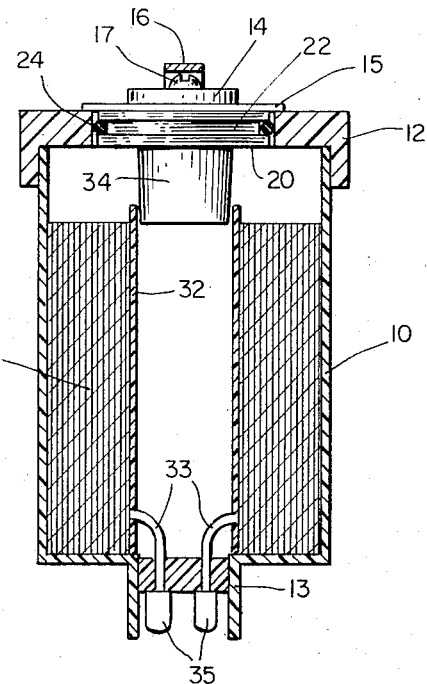
FIG. 2 is a cross-section on the line 2—2 of FIG. 1 of the battery with the valve in the closed position.

In FIG. 2, showing a partial cross section of the same battery, the valve 20 is shown in the closed position. It is seen that this valve is of the seatless type. It has a circumferential groove 22 wherein an elastomeric seal ring 24 is located. The battery element, comprising cathode sheets, anode sheets and separator means is located in the annular space 30. Suitable anodes (negative electrodes) for use in seawater electrolyte include metallic zinc, magnesium or aluminum. Typical cathodes (positive electrodes) used are the halides of lead, copper and silver. Particularly suitable couples are lead chloride-magnesium, silver chloride-magnesium and cuprous chloride-magnesium. A guide tube 32 is located within the annular space 30. A valve stem 34 located on the underside of valve 20 rides in the guide tube 32. The combination of guide tube 32 and stem 34 causes the valve 20 to move in an axial mode and prevents it from tipping in any direction. Thus, it is seen that the valve of the invention is prevented from coming out of the battery by stop 16, it is prevented from going into the battery and opening by valve retainer means 15 until a predetermined pressure differential between the outside of the battery and the inside of the battery is reached (as determined by the spring constants of valve retainer 15). When the valve is caused to move by the pressure differential, it can move only in the direction of its axis.

Figure 3:
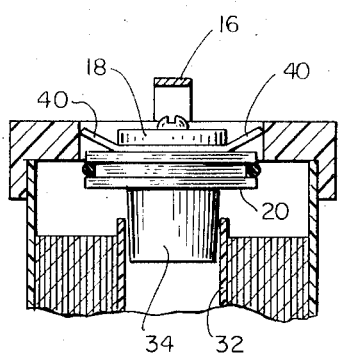
FIG. 3 is a cross-section of a part of the battery with the valve in the partially open position; and, FIG. 4 is the cross-section of FIG. 3 with the valve fully open.
Figure 4:
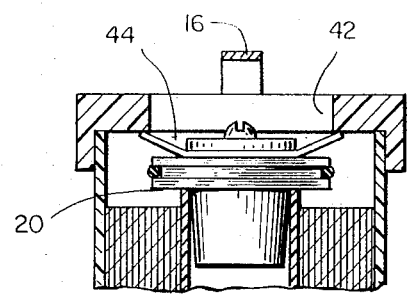

FIG. 3 shows the location of the valve after it has started to move as a result of a suitable pressure differential. It is seen that motion of the valve 20 has forced upward the ears 40 of the valve retainer 15 reducing the projected diameter of the retainer so that it can enter the valve opening 42 (FIG. 4).

As noted above, the valve retainer 15 is attached to the valve face 14 by a screw or other fastening means 17. In a preferred embodiment, a backing piece such as a washer 18 is located between the head of the fastener 17 and the valve retainer 15.

The backing piece 18 is shown as being shorter than the diameter of valve 20. It is important that it is shorter so as to permit the entry of the valve retainer 15 into the valve opening 42. The opening pressure of the valve is determined by the physical properties of the material of the retainer, the cross section of the retainer and by the distance from the edge of the backing piece to the edge of the valve opening. In FIG. 4, the valve is shown at the end of its travel. The valve 20 is shown resting on the top of the guide tube 32. The valve has traveled far enough to allow the ears 40 to spring out so that they are of a diameter greater than valve opening 42. A permanent passage 44 is maintained between the inside of the battery and the water surrounding it so that valve will not reclose even if the battery receives severe shock, etc. In a typical application the pressure differential between the inside of the battery and the outside desired to cause the valve to open is in the order of 60 lbs. per square inch.

The permanent passage 44 from battery to water supply is needed because the battery requires a continuing supply of fresh water during its discharge cycle.

A feature of the valve retainer and valve combination described is that it takes somewhat more pressure to start it moving than it does to keep it moving after is has started. This permits the valve to develop a velocity as it opens and allows for the overtravel needed to form the opening 44 as shown in FIG. 4. However, it can be seen also that even if the valve should not overtravel enough to permit the ears 40 to spring down, the valve would still be maintained in an open position due to the jamming action of the ears 40 against the walls of the opening 42.

EXAMPLE

In a particular type of small seawater battery, a valve opening (42 in Drawing 4) was chosen to be 1.0 inches in diameter. A valve having a free fit in the valve opening and sealed to the valve opening by a synthetic rubber O-ring was located in the valve opening. The valve was prevented from passing through the valve opening by a valve retaining bar. This bar was made of aluminum, 1.125 inches long, 0.250 inches wide and 0.025 inches thick. The bar was backed up by a metal backing piece of disc shape. The following tests were performed: (Note: The type of aluminum used was type 2024–T3 ):

The valve was set in the side of a pressure box with arrangements for slowly raising the pressure as follows:

Test 1 diameter of backing piece = .817 inches, opening Pressure = 87 PSI
Test 2 diameter of backing piece = .780 inches, opening Pressure = 70 PSI
Test 3 diameter of backing piece = .772 inches, opening Pressure = 68 PSI
Test 4 diameter of backing piece = .772 inches, opening Pressure =67 PSI
Test 5 diameter of backing piece = .772 inches, opening Pressure = 67 PSI
Test 6 diameter of backing piece = .772 inches, opening Pressure = 69 PSI
Test 7 diameter of backing piece =.772 inches, opening Pressure =68 PSI Additional tests were run on the construction of test 3. In these tests, the pressure was applied rapidly to a preset valve rather than slowly:

Test 8 Pressure 55 PSI valve did not open
Test 9 Pressure 70 PSI valve opened
Test 10 Pressure 55 PSI valve did not open
Test 11 Pressure 68 PSI valve opened
Test 12 Pressure 70 PSI valve opened
Test 13 Pressure 70 PSI valve opened These tests show the manner in which an opening pressure may be selected and also show the uniformity of the opening pressure once the design parameters have been selected.

Having described an invention and given examples of its embodiment, we hereby claim:

1. In a seawater battery comprising a container and a cover, the container having positive and negative electrodes therein, the cover defining a circular opening therethrough, the opening providing access between the interior of the container and the space exterior thereto, the improvement which comprises:
   a. a valve member located in and closing the opening in the cover, the valve member including an externally exposed face;
   b. a valve retaining means comprising a bar of ductile material fastened to the externally exposed face of the valve, said valve retaining means being greater in length than the diameter of the opening in the container and spanning said opening and said valve retaining means being capable of being deformed under external pressure of seawater such that when a predetermined external pressure is applied to said valve member, said valve member is urged inwardly through and out of said opening thereby allowing seawater to enter said battery.

2. A seawater battery as defined in claim 1 and including a valve stop spanning the valve opening for preventing the valve from coming out of the battery, a guide tube located within the battery, and a valve stem located on the underside of the valve and riding in the guide tube.

3. A seawater battery as defined in claim 1 wherein the positive electrodes are selected from the group which consists of the halides of lead, silver and copper and the negative electrodes are selected from the group which consists of metallic magnesium, zinc and aluminum.

4. A seawater battery as defined in claim 1 wherein the valve retaining means includes a valve retaining backing piece, the length of the backing piece being less than the diameter of the valve.

5. A seawater battery as defined in claim 4 wherein the valve retaining means has a set of predetermined physical constants, the physical constants of the retaining means and the length of the backing piece being such that when the valve face is exposed to external fluid pressures less than a chosen pressure the valve remains closed and when the valve face is exposed to pressures greater than the chosen pressure the valve will open.

6. A seawater battery as defined in claim 1 wherein the valve is a seatless valve including an elastomeric seal ring.

7. A seawater battery as defined in claim 1 wherein the chosen pressure above which the valve will open is about 60 pounds per square inch.

* * * * *